May 8, 1962    O. HÄNSEL ETAL    3,033,343

FEEDING DEVICE FOR PACKING MACHINES

Filed Jan. 30, 1959

INVENTORS:
Otto Hänsel and
Hans Persh
BY Ernest Montague
Attorney

United States Patent Office 3,033,343
Patented May 8, 1962

3,033,343
FEEDING DEVICE FOR PACKING MACHINES
Otto Hänsel and Hans Lesch, Hannover, Germany, assignors to Otto Hansel, Junior G.m.b.H., Hannover, Germany, a corporation of Germany
Filed Jan. 30, 1959, Ser. No. 790,160
1 Claim. (Cl. 198—30)

The present invention relates to a device for feeding candy or the like to the wrapping station of a packing machine.

It is known to use rotary feeding plates in these machines to feed the individual candy to the wrapping station, the feeding plate being provided with several peripheral rows of openings which receive the candy supplied from a storage container. At a convenient place of the machine, the candy is ejected by means of an ejecting plunger, and the candy, together with the wrapping material, is pressed through a folding tunnel, a brush channel, or the like where the wrapping material is folded around the candy. When feeding plates with several rows of openings are used, the candy is ejected by means of a multiple ejector, i.e. the ejector discharges one candy from each row at the same time. This means that each row has to be provided with the same number of openings. The number of openings in each row is determined by the diameter of the inner row of the feeding plate. The bridges remaining between the openings must be strong enough to carry the outer parts of the feeding plate and to take the stress during operation. Since the same number of openings is provided in the outer rows, the bridges between these openings are comparatively wide. Thus, in the outer rows the plate is utilized insufficiently only. Furthermore, the wide bridges make it difficult to feed the candy into the openings of the outer rows. It is another disadvantage of known designs that the masses to be accelerated and retarded during the intermittent operation of the feeding plate, are comparatively great, so that strong vibrations are transmitted to the machine.

It is one object of the present invention to provide a feeding device for packing machines which eliminates these deficiencies by providing a feeding plate which is divided into several parts, rings, or the like, each having a row of openings. The spacing of the openings in the various rings differs from ring to ring. A greater number of openings is provided in the outer rings than in the inner rings. The rings forming the feeding plate are separately driven at different speeds so that at the discharge point the openings of all of the rings register to be discharged at the same time by an ejecting device common to all of them.

It is another object of the present invention to provide a feeding device for packing machines wherein the division of the feeding plate into several rings or the like and the separate drive of these various parts enable the outer rings to be provided with numerous, especially many small openings. The vibrations in the machine caused by intermittent operation are counterbalanced, because the masses to be moved are smaller and the masses are driven at different speeds in a different operating rhythm.

It is yet another object of the present invention to provide a feeding device for packing machines wherein each of the plate members, i.e. each of the rings or the like is provided with a separate return device for surplus candy accumulating on the surface of the ring, each return device comprising brushes, scrapers, or the like arranged in known manner.

It is also still a further object of the present invention to provide a feeding device for packing machines wherein it is of particular advantage to use this novel feeding device as a feeding and distributing means for several packing machines, in that each row of openings supplies a separate ejecting member with candy.

With these and other objects in view, which will become apparent in the following detailed description, the present invention will be clearly understood in connection with the accompanying drawing, in which.

Figure 1:
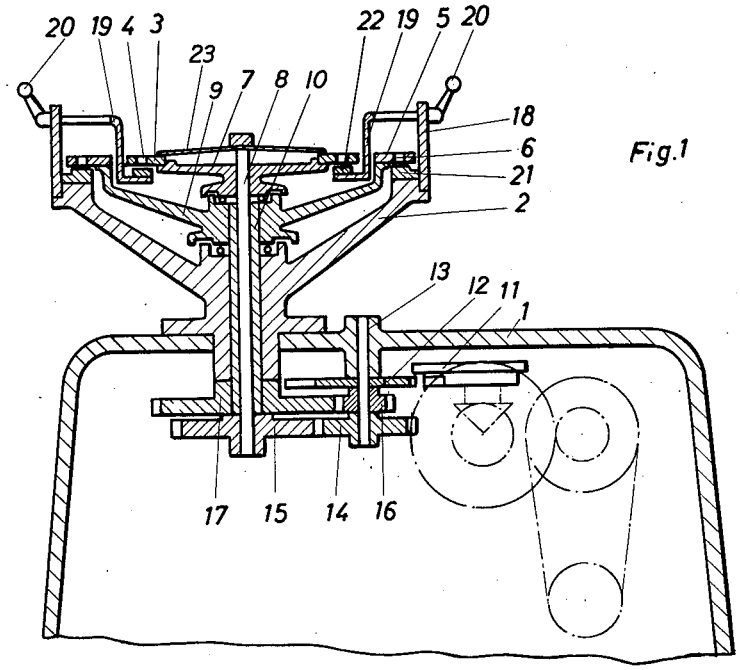
FIGURE 1 is a sectional view of a feeding plate and its drive means.

Referring now to the drawing, the feeding plate is accommodated in a housing 1 which also contains the drive means for the different parts of the feeding plate. For this purpose, an open support 2 which tapers in upward direction, is arranged on the housing 1. In the embodiment illustrated, the feeding plate itself comprises two separate rings, the first inner ring 3 having smaller diameter and openings 4, and the larger outer ring 5 having openings 6.

Figure 2:
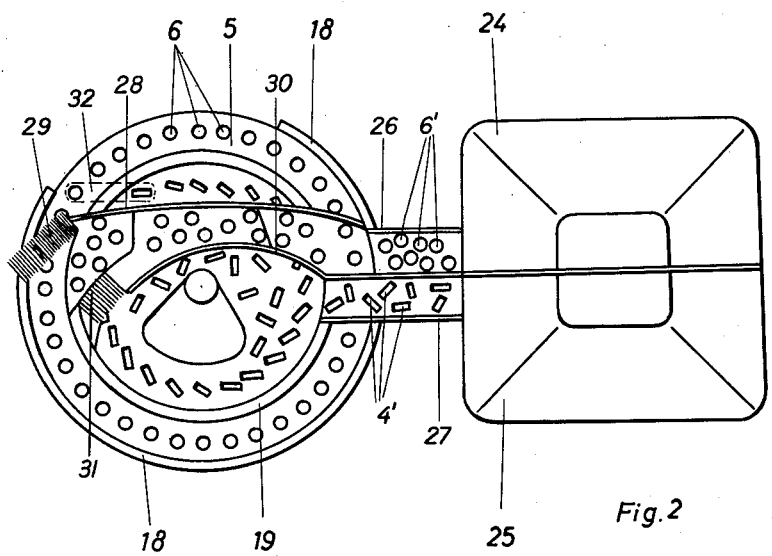
FIG. 2 is a top plan view on the feeding plate as shown in FIG. 1 and on the candy container.

As shown in FIG. 2, the openings are of different shape in the receptive rings 3 and 5. The openings 6 in the outer ring 5 receive round candy 6', and the rectangular openings 4 of the inner ring receive rectangular candy 4'. FIG. 2 also shows that the outer ring 5 is provided with a greater number of openings 6 than the inner ring 3. The latter is carried by a plate 7, mounted on a shaft 8. The outer ring 5 is fitted to a plate or support 9 which in turn is keyed on a hollow shaft 10 enclosing the shaft 8.

According to the present invention, the rings 3 and 5 are driven separately. For this purpose, a Maltese cross 12 is provided in the usual manner which is journalled on a shaft 13 in the housing 1 and driven by a rotating crank 11. By intermittent rotation of the shaft 13 of the Maltese cross 12, the outer ring 5 is driven through means of a pair of gears 16, 17 and the hollow shaft 10, while the inner ring 3 is driven through means of a pair of gears 14, 15 and the center shaft 8. The transmission ratio of the drive gears has been calculated in such manner that after each forward movement one opening of each of the rings 3 and 5 is above the ejector 32 (FIG. 2), to enable the ejection of one candy each from both rows of openings. The outer ring 5 with the openings 6 is provided with a wall 18 which prevents the candy from falling off the plate. The inner ring 3 with its openings 4 is also enclosed by a wall 19 which at the same time forms the inner wall of the outer row of openings 6.

The inner wall 19 is fitted to the outer wall 18 by means of screws, toggles 20, or the like. Grids 21 and 22 or the like extend beneath the rings 3 and 5 to allow broken candy to fall down.

As can be clearly seen, the different parts are easily dismanteled to facilitate cleaning of the machine or a change of the type of candy by exchanging either one or both of the rings 3 and 5.

The center part of the plate 7 is covered by a circular cap 23.

The candy to be wrapped is filled into a container having two chambers 24, 25 one for each type of candy, from which it is passed through separate vibrating channels 26 and 27 to the respective rings 3 and 5.

The candy which is not received by the openings of the inner ring 3 is brushed aside by a brush 31 arranged above the inner ring. The candy slides along a vertical wall 30, and thus reaches the initial position again without getting mixed up with the candy for the outer ring. Surplus candy from the outer ring is similarly returned with the aid of a brush 29 and a wall 28. In this way, it is ensured that only one uniformly and completely filled row is formed and that in any case only one piece of candy is passed from the rings forming the feeding plate to the ejecting station, where one piece of candy from each row is ejected and wrapped at the same time by means of a multiple ejector 32.

While we have disclosed one embodiment of the present invention, it is to be understood that this embodiment is given by example only and not in a limiting sense, the scope of the present invention being determined by the objects and the claim.

We claim:

A device for feeding candy or the like to a wrapping station of a packing machine comprising at least two rings disposed in the same horizontal plane, means for rotating said rings independently from each other, and a plurality of openings disposed along a circular line on each of said rings, the spacing of said openings being shorter in the outer of said rings than in the inner of said rings, said means for rotating said rings independently from each other including means for driving said rings at different speeds to stop each of said rings for discharge of said candy with their respective openings at a predetermined point, to permit simultaneous discharge of the corresponding openings of all said rings.

References Cited in the file of this patent

UNITED STATES PATENTS

| | | |
|---|---|---|
| 937,152 | Kallenbach | Oct. 19, 1909 |
| 2,457,220 | Fowler | Dec. 28, 1948 |
| 2,742,184 | Yerkes et al. | Apr. 17, 1956 |
| 2,801,025 | Cookson et al. | July 30, 1957 |